Figure 1:
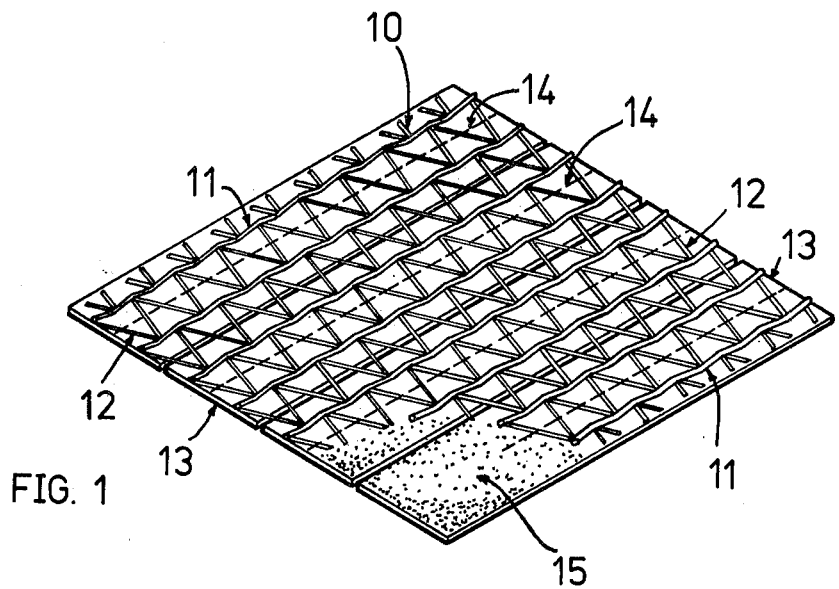

United States Patent [19]

Mushin et al.

[11] 4,090,325
[45] May 23, 1978

[54] KNITTED FABRIC MULCHES

[76] Inventors: Aaron Mushin, 13 Pearson Grove, Caulfield, Victoria, Australia, 3162; Yaacov Saporta, 64 Finch St., East Malvern, Victoria, Australia, 3144

[21] Appl. No.: 816,158

[22] Filed: Jul. 15, 1977

[30] Foreign Application Priority Data

Jul. 21, 1976 Australia .............................. 6720/76

[51] Int. Cl.² ........................ A01G 7/00; A01G 13/02; B32B 3/16; B32B 7/08
[52] U.S. Cl. ......................................... 47/9; 428/101; 428/196; 428/198; 428/211; 428/253
[58] Field of Search ...................... 47/9; 428/101, 196, 428/211, 198, 253

[56] References Cited
U.S. PATENT DOCUMENTS 2,045,317 6/1936 Sobie ................................... 428/253
3,181,273 5/1965 West et al. ................................. 47/9
3,315,408 4/1967 Fisher ......................................... 47/9

FOREIGN PATENT DOCUMENTS 467,392 11/1975 Australia ............................. 428/253

Primary Examiner—J.C. Cannon

[57] ABSTRACT

A mulch product comprising an open-mesh fabric having knittedly inter-connected longitudinal and transverse yarn elements and a multiplicity of parallel strips of paper or other suitable material secured to a surface of the knitted fabric so as to form a laminated product wherein displacement between the strips and the knitted fabric in a direction parallel to the longitudinal elements of the knitted fabric is substantially prevented when the fabric is stretched in a direction at right angles to the longitudinal yarn elements and wherein one or both edge portions of the strips are free to move away from the fabric.

11 Claims, 2 Drawing Figures

KNITTED FABRIC MULCHES

This invention is concerned with the provision and utilization of knitted fabric mulches, the term "mulch" as used herein meaning a protective covering which may be spread or left upon the ground to reduce evaporation, reduce soil temperature variations, prevent erosion, control weeds, or enrich the soil.

Nettings of various types have been employed or suggested for use in applications such as highway construction and maintenance, landscaping, and strip mine recovery. With the possible exception of certain landscaping applications, all such uses require a system needing little maintenance once the area covered by the netting is planted. It would be highly desirable to have a satisfactory product which would both degrade enough to allow full development of vegetation and yet provide permanent erosion control.

Australian Pat. No. 467,392 describes a knitted fabric mulch product in the form of an open-mesh knitted fabric having strips of paper or the like located between and parallel to the longitudinal yarn elements of the fabric and interleaved between the transverse yarn elements. This type of product has the disadvantage that its production requires especially adapted knitting machines to interleave the paper or like between the transverse elements of the knitted fabric. An example of such a machine is described in U.S. Pat. No. 3,507,130 and it will be apparent that such machines are complicated and expensive, thus adding materially to the cost of producing the mulch product.

It has also been found that, because the paper or like strips are interleaved between the transverse yarn elements, the vegetation is prevented from developing evenly prior to disintegration of the strips. Thus, when new growth begins, the paper or like strips often form a barrier which the young shoots are unable or find difficult to penetrate and are thus squashed or damaged or are distorted as their only outlets are the narrow gaps between the strips.

A further disadvantage of this type of product is that when the fabric is stretched in the direction of the transverse elements, the strips are displaced relatively to the longitudinal elements whereby undesirable wrinkling or distortion of the surface of the product will frequently occur.

The main object of our invention is to provide an improved mulch product in which some or all of the above-mentioned disadvantages are obviated. Other objects and advantages will become apparent from the following description.

According to the present invention we provide a mulch product comprising an open-mesh fabric having knittedly interconnected longitudinal and transverse yarn elements and a multiplicity of parallel strips of paper or other suitable material secured to a surface of the knitted fabric so as to form a laminated product wherein displacement between the strips and the knitted fabric in a direction parallel to the longitudinal elements of the knitted fabric is substantially prevented when the fabric is stretched in a direction at right angles to the longitudinal yarn elements and wherein one or both edge portions of the strips are free to move away from the fabric.

The paper or other material may be secured to the surface of the fabric by means of stitching, sticking, ultrasonic welding or any other suitable method. Preferably the strips are disposed parallel to the longitudinal elements of the knitted fabric and may be perforated to allow increased seepage of water on to the ground through the mulch.

Preferably the mulch comprises a laminated product in the form of an open-mesh knitted fabric to which strips of paper, arranged parallel to the longitudinal elements of the knitted fabric, are secured along their centre lines to the fabric by rows of stitching disposed between the longitudinal elements of the fabric whereby the strips are secured to the transverse elements in such manner that relative displacement between the fabric and the strips in a direction parallel to the longitudinal elements is prevented when the fabric is stretched in a direction at right angles to the longitudinal elements and the edge portions of the strips are not held to the fabric and are free to move away therefrom. The strips normally occupy the same overall area as the knitted fabric, but may cover only a portion of such area.

Figure 2:
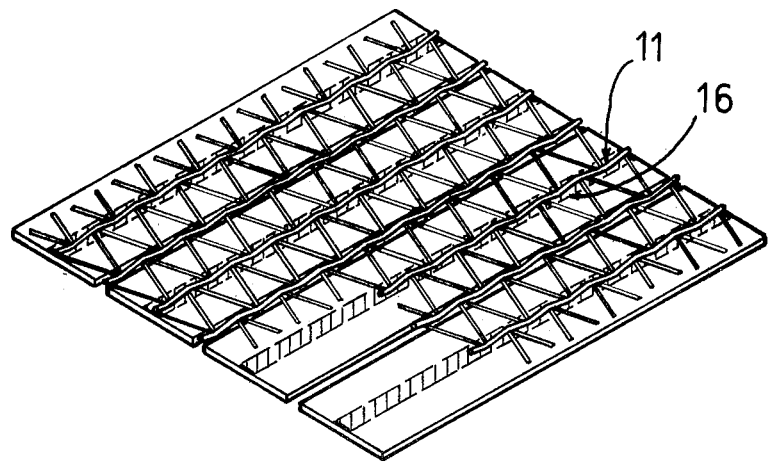

To further describe our invention, reference will now be made to the accompanying drawings, in which:

FIG. 1 is a fragmentary perspective view of one embodiment of the invention, and FIG. 2 is a similar view of another embodiment.

As shown in FIG. 1, the mulch product includes an open-mesh knitted fabric generally designated at 10 in which the longitudinal yarn elements 11 consist of parallel lines of interconnected loops. Adjacent longitudinal elements are joined by a continuous yarn element which runs back and forth in zig-zag fashion between the longitudinal elements to define the transverse yarn elements 12. Different types of knitted stitches, such as the jersey stitch or the full tuck stitch, may be employed. In at least one direction, such as the direction of the transverse elements, the fabric has considerable stretchability, as contrasted with the relative non-stretchability of woven fabrics.

Strips of paper or other suitable material 13, of a width slightly less than twice the distance between adjacent longitudinal elements 11, are stitched along their centre lines as shown at 14 whereby they are secured to the zig-zag transverse elements 12 leaving small gaps between adjacent edges of the strips. In this way, the edge portions of the strips are not constrained and are able to be moved out of contact with the fabric. The effects of this arrangement will be referred to hereinafter. As indicated at 15 the strips may be perforated to allow increased seepage of water on to the ground through the mulch.

FIG. 2 shows a mulch product generally similar to that shown in FIG. 1 except that the strips, instead of being stitched to the transverse elements, are secured by a suitable adhesive 16 to the longitudinal elements 11. The strips could also, or alternatively, be adhered to the transverse yarn elements. In this embodiment the strips are of the same width as those shown in FIG. 1, but it is apparent that the strips may be of any convenient or suitable width. It has been found, for instance, that strips about 2 cms. wide are suitable for general use. It is also not essential for the strips to be attached to the fabric along their centre lines. Such attachment could be made otherwise as long as at least one edge portion of each strip is unconstrained.

In the fabrics employed in this invention, a wide variety of knitting yarns may be used, depending upon the physical properties and durability required for the end use application. The yarn fibers, which may be used in deniers ranging from 50 to 850, for example, may include one or more of the following types of materials:

(a) Natural Fibres
Cotton
Linen
Jute
(b) Synthetic Plastics
Acrylic (e.g. acrylontrile)
Nylon (e.g. Nylon 6 or Nylon 66)
Olefin (e.g. polypropylene)
Polyester (e.g. Terylene)
Vinylic (e.g. Saran)
Urethane (e.g. Spandex)
(c) Reconstituted Fibres
Rayon
Triacetate
(d) Glass
(e) Metal
Stainless steel The strips may be formed of materials such as paper, metal foil, plastics, or combinations of the same, depending upon the intended end application of the product. Paper strips may have selected degrees of biological degradation, the following being a list of suitable papers, which are listed in order of increasing rate of resistance to biological degradation:

1. Unsized, unhydrated, kraft composed of at least 80% hardwood fiber
2. Southern bag papers standard grades
3. Recycled waste paper
4. Paper treated with mold-inhibiting chemicals
5. Paper same as 4 but coated on one or two sides with a barrier coating.

In most instances, the strips will be opaque, but in some instances (as where it is desired to reflect heat), the strips may be light-reflecting. The strips normally cover at least a major portion of the area of the fabric.

The product will normally be produced in rolls of suitable size such as, for example, 4½, 5 or 10 feet wide. In this form, long lengths of the mulch can be readily handled and laid in position on level or sloping ground.

By suitable selections of materials for the knitted fabric and the strips laminated thereto, mulches according to the invention may be used for a large variety of purposes. Thus the system may be used for landscaping, including lawn or grass development, erosion control and the growing of ornamental crops, the growing of stabilizing erosion control elements in hostile environments, modification of soil chemical properties, and food production, including the growing of vegetables or grains.

The materials used to form the mulch products may be varied to meet a variety of end use requirements, so that the system may be tailored to a particular application. For example, where the application is rapid lawn development with minor erosion control thereafter, a biodegradable mesh knitted fabric may be employed together with a paper that will degrade rapidly. For a ditch liner, however, where permanent protection is required, a non-degradable yarn and a permanent paper, such as a polyethylene coated paper may be used.

Normally, the mulch is applied to the land surface with the paper or like strips uppermost. In this position the edges of the strips are not as flat as when covered by the knitted fabric and this allows a more even distribution of rain or other water falling on the surface, particularly before the mulch had degraded to any substantial extent.

In a typical use of a mulch product according to the invention, irregularities in the ground surface, such as corrugations, eroded waterways and the like are made as even as possible and a suitable mixture of fertilisers applied to the soil. Seeding is then carried out on the soil surface, overlapping strips of the mulch product laid out over the seeded area and these strips are then anchored in place in any suitable way, such as by means of long ground-engaging nails or staples (e.g. 15 to 25 cms in length) or by anchoring wires.

On shallow slopes (up to about 20°) the mulch should be laid horizontally (i.e. across the slope) while for greater slopes it is recommended that the mulch be laid out in a direction at right angles to the contours (i.e. up the slope).

It is found that the knitted fabric, the whole of which is able to lie in contact with the ground, effectively holds the soil particles in place and also minimises the force of water flow by reason of its multi-diversion ability provided by the pattern of knitting. However, it chiefly acts as an artificial root system and is finally incorporated into the soil surface.

The strips of paper or the like break the force of falling raindrops, act as a protective cover for the germinating seeds, limit evaporation and extend the time of moisture retention in the soil. The effective life of paper strips may extend up to four months before disintegration and incorporation as mulch into the soil. Various types of paper would, of course, vary the life span.

As the edge portions of the strips are not constrained, the strips can function with a "wing" effect whereby their edge portions can be lifted away from the fabric by the growing shoots to provide greater access of sunlight and water to the young plants and also improved ventilation. This last factor is believed to be of importance in minimizing the growth of undesirable micro-organisms which could have a detrimental effect on germination and growth. After the edges of the strips have been lifted away from the fabric, the sloping edge portions continue to provide protection to the young shoots against wind and rain. Also, because it is easy for the young shoots to lift the edge portions of the strips away from the fabric, the strips do not form a "barrier" to growth as can occur with the prior art mulch products. Products according to the present invention are also free of the wrinkling and distortion problems of the prior art.

Field tests were carried out to evaluate the comparative performance of a typical mulch according to the invention and a mulch of the type described in Australian Pat. No. 467,392. The mulch according to the present invention (hereinafter referred to as mulch "A") comprises an open-mesh fabric knitted from coarse polypropylene yarn. The fabric consisted of longitudinal elements in the form of parallel lines of interconnected loops, adjacent pairs of these lines being joined by a continuous yarn running back and forth in zig-zag fashion to define the transverse elements. Strips of brown paper 2 cm wide are secured to one surface of the fabric by being stitched along their centre lines to the transverse elements. Small gaps are left between adjacent edges of adjoining strips, and the edge portions of the strips are not secured to the fabric. The mulch according to Australian Pat. No. 467,392 (hereinafter referred to as mulch "B") was made from fine silky polypropylene fibers having brown paper strips located between and parallel to the longitudinal yarn elements and interleaved between loops of yarn constituting the transverse yarn elements.

The two mulches were used under similar conditions in ryegrass germination tests on uneven sloping ground with the following results, mulch "A" being applied to the ground with the paper strips uppermost (a) mulch "A" accommodated to the unevenness of the ground surface better than mulch "B" and provided a more noticeable multi-diversion effect on channelling water. A long term result of these differences would be that mulch "A" would provide more effective erosion control than mulch "B", (b) mulch "A" promoted denser and more even germination than mulch "B". This is believed to be due to the presence of the small gaps between the edges of the strips and more importantly to the "wing" effect as referred to above and which is not present in mulch "B".

From the above description, it will be apparent that mulch products in accordance with our invention can be produced readily by comparatively cheap machinery, can be readily modified as may be required to suit the intended end use and overcome the disadvantages of the prior art products as discussed above.

The claims defining the invention are as follows:

1. A method of mulching which comprises providing a mulch product in the form of an open-mesh fabric having knittedly inter-connected longitudinal and transverse yarn elements and a multiplicity of parallel strips of paper or other suitable material secured to a surface of the knitted fabric so as to form a laminated product wherein displacement between the strips and the knitted fabric in a direction parallel to the longitudinal elements of the knitted fabric is substantially prevented when the fabric is stretched in a direction at right angles to the longitudinal yarn elements and wherein one or both edge portions of the strips are free to move away from the fabric; and covering an area of ground with said product with said strips uppermost.

2. A mulch product comprising an open-mesh fabric having knittedly inter-connected longitudinal and transverse yarn elements and a multiplicity of parallel strips of paper or other suitable material secured to a surface of the knitted fabric so as to form a laminated product wherein displacement between the strips and the knitted fabric in a direction parallel to the longitudinal elements of the knitted fabric is substantially prevented when the fabric is stretched in a direction at right angles to the longitudinal yarn elements and wherein one or both edge portions of the strips are free to move away from the fabric.

3. a mulch product according to claim 2, wherein the strips are secured to the surface of the fabric by stitching.

4. A mulch product according to claim 2, wherein the strips are secured to the surface of the fabric by sticking.

5. A mulch product according to claim 2, wherein the strips are secured to the surface of the fabric by ultrasonic welding.

6. A mulch product according to claim 2, wherein the strips are stitched along their centre lines to the fabric thereby leaving both edge portions of the strips unconstrained.

7. A mulch product according to claim 2, wherein the strips are perforated.

8. A mulch product according to claim 2, wherein the strips are disposed parallel to the longitudinal elements of the fabric.

9. A mulch product according to claim 8, wherein adjacent longitudinal elements of the fabric are joined by a continuous yarn element which runs back and forth in zig-zag fashion between the longitudinal elements to define the transverse elements.

10. A mulch product according to claim 8, wherein the strips are secured to the fabric by rows of stitching disposed between the longitudinal elements of the fabric.

11. A mulch product according to claim 10, wherein adjacent longitudinal elements of the fabric are joined by a continuous yarn element which runs back and forth in zig-zag fashion between the longitudinal elements to define the transverse elements.

* * * * *